US009154031B2

(12) United States Patent
Weng et al.

(10) Patent No.: US 9,154,031 B2
(45) Date of Patent: Oct. 6, 2015

(54) CURRENT MODE DC-DC CONVERSION DEVICE WITH FAST TRANSIENT RESPONSE

(71) Applicant: ANPEC ELECTRONICS CORPORATION, Hsinchu (TW)

(72) Inventors: Chia-Chieh Weng, Nantou County (TW); Chin-Hong Chen, Taichung (TW)

(73) Assignee: Anpec Electronics Corporation, Hsinchu (TW)

( * ) Notice: Subject to any disclaimer, the term of this patent is extended or adjusted under 35 U.S.C. 154(b) by 107 days.

(21) Appl. No.: 14/056,062

(22) Filed: Oct. 17, 2013

(65) Prior Publication Data

US 2015/0008895 A1 Jan. 8, 2015

(30) Foreign Application Priority Data

Jul. 3, 2013 (TW) ............................ 102123793 A

(51) Int. Cl.
*H02M 3/156* (2006.01)

(52) U.S. Cl.
CPC ...... *H02M 3/156* (2013.01); *H02M 2003/1566* (2013.01)

(58) Field of Classification Search
CPC ..................................................... H02M 3/156
USPC ................................. 323/271, 282, 284, 285
See application file for complete search history.

(56) References Cited

U.S. PATENT DOCUMENTS 5,029,269 A * 7/1991 Elliott et al. ................ 363/21.1
7,928,715 B2 * 4/2011 Shibata ........................ 323/288
8,593,125 B1 * 11/2013 Xue ............................. 323/284
2009/0001952 A1 1/2009 Chang et al.
2011/0193539 A1 * 8/2011 Schmidt et al. .............. 323/282
2012/0274295 A1 11/2012 Lin et al.

FOREIGN PATENT DOCUMENTS

CN 102594144 A 7/2012
TW 191306 9/1992
TW 200901610 A 1/2009
TW 201244356 A 11/2012

* cited by examiner

*Primary Examiner* — Timothy J Dole
*Assistant Examiner* — Ishrat Jamali
(74) *Attorney, Agent, or Firm* — Rosenberg, Klein & Lee

(57) ABSTRACT

A current mode DC-DC conversion device with fast transient response is provided. The device includes a DC-DC converter, a pulse width control unit, a current feedback circuit, a fast transient feedback circuit, a first error amplifier, an adder, and a comparator. The current feedback circuit generates a current feedback signal according to the current passing through an inductor in the DC-DC converter. The fast transient feedback circuit generates a transient feedback signal according to a first voltage feedback signal. The first error amplifier amplifies the difference value between a second voltage feedback signal and a reference signal to generate an error amplification signal. The comparator compares the error amplification signal and the summation of current feedback signal and transient feedback signal to generate a comparison signal. The comparison signal is provided to the pulse width control unit for controlling the duty cycle of the power switch.

9 Claims, 5 Drawing Sheets

CURRENT MODE DC-DC CONVERSION DEVICE WITH FAST TRANSIENT RESPONSE

BACKGROUND OF THE INVENTION

1. Field of the Invention

The present disclosure relates to a current mode DC-DC conversion device; in particular, to a current mode DC-DC conversion device with fast transient response.

2. Description of Related Art

The DC-DC converter is for converting the DC input voltage into the DC output voltage. For the controlling of the DC-DC converter, the control method of both the boost converter and the buck converter can be distinguished into two modes including the voltage mode and the current mode. The principles of the voltage mode controlling mainly depend on detecting the changes of the output voltage and controlling the output voltage to an expected value according to the circuit feedback mechanics. The principles of the current mode controlling mainly depend on detecting the current changes of the inductors for accelerating the transient response time caused by the changes of the loads. Comparing with the voltage mode controlling, the current mode controlling has better load regulation and line regulation capabilities, and has faster transient response.

SUMMARY OF THE INVENTION

The present disclosure provides a current mode DC-DC conversion device with fast transient response. Comparing with the conventional current mode control mechanics, the device may be able to make the output voltage fast respond to different load changes in continuous time.

The present disclosure provides a current mode DC-DC conversion device with fast transient response. The device includes a DC-DC converter, a pulse width control unit, a current feedback circuit, a fast transient feedback circuit, a first error amplifier, an adder, and a comparator. The DC-DC converter has an inductor and at least one power switch, and the power switch is coupled to the inductor. The DC-DC converter converts an input voltage into an output voltage. The pulse width control unit is coupled to the power switch. The current feedback circuit detects the current passing through the inductor, and generates a current feedback signal according to the detected current passing through the inductor. The fast transient feedback circuit generates a transient feedback signal according to a first voltage feedback signal, and the first voltage feedback signal is responding to the output voltage. The first error amplifier amplifies the difference value between a second voltage feedback signal and a reference signal for generating an error amplification signal, and the second voltage feedback signal is responding to the output voltage. The adder adds the current feedback signal with the transient feedback signal, for generating a modifying current feedback signal. The comparator compares the error amplification signal with the modifying current feedback signal for generating a comparison signal. The comparator provides the comparison signal to the pulse width control unit, and the pulse width control unit controls a duty cycle of the power switch of the DC-DC converter according to the comparison signal.

On the basis of the above, the present disclosure provides a current mode DC-DC conversion device with fast transient response. By adding up the feedback voltage and the current feedback signal through the fast transient feedback circuit, the present disclosure is able to make the output voltage relatively fast respond to different load changes in continuous time.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

[an embodiment of a current mode DC-DC conversion device with fast transient response]

Figure 1:
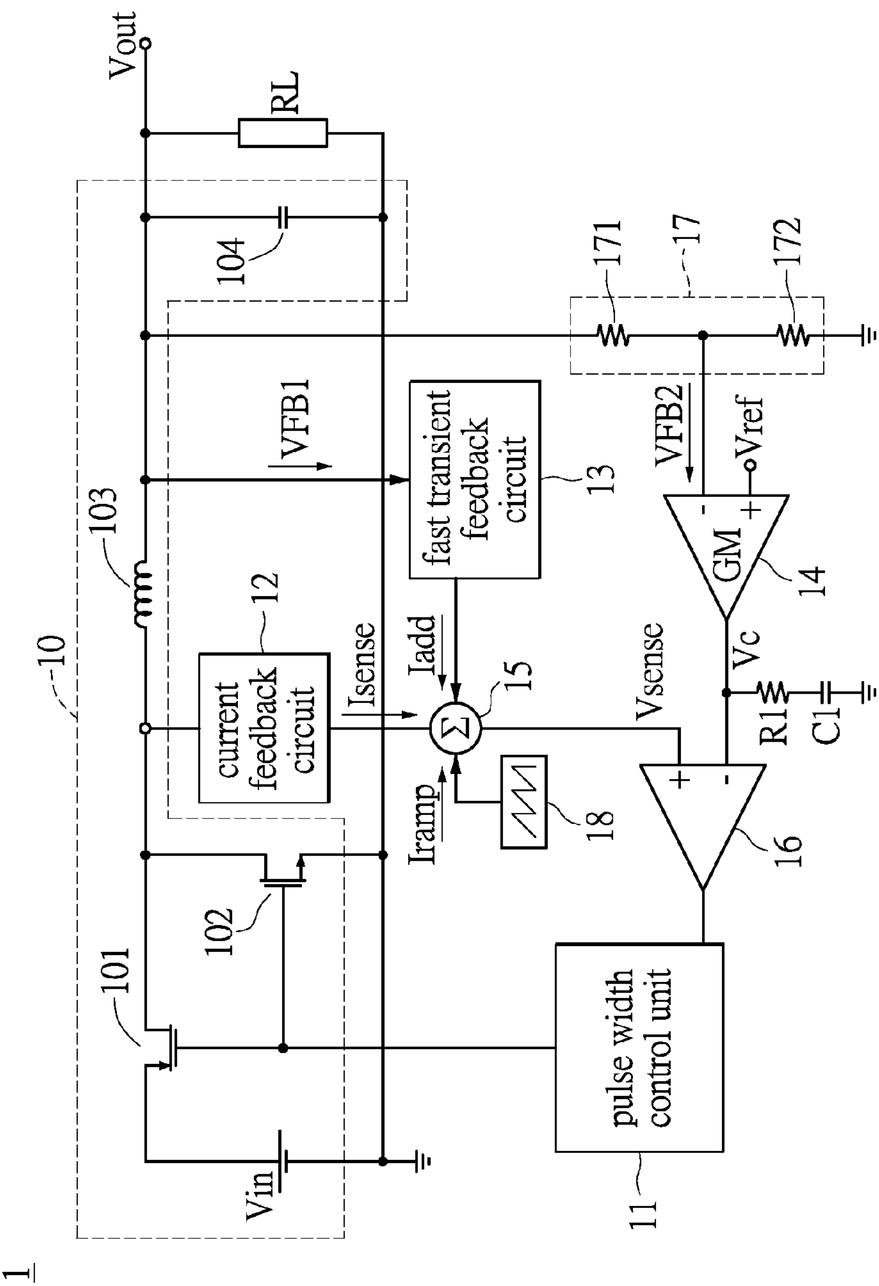
FIG. 1 shows a circuit diagram of a current mode DC-DC conversion device with fast transient response according to an embodiment of the present disclosure.

Please refer to FIG. 1 which shows a circuit diagram of a current mode DC-DC conversion device with fast transient response according to an embodiment of the present disclosure. The current mode DC-DC conversion device 1 with fast transient response includes a DC-DC converter 10, a pulse width control unit 11, a current feedback circuit 12, a fast transient feedback circuit 13, a first error amplifier 14, an adder 15, a comparator 16, a voltage feedback circuit 17, a ramp generator 18, a resistor R1 and a capacitor C1.

The DC-DC converter 10 converts the input voltage Vin into the output voltage Vout, and the output voltage Vout is provided to the load RL. The DC-DC converter 10 in this embodiment is a buck converter, however, the present disclosure does not limit the type of the DC-DC converter 10, it can also be a boost converter. In addition, the voltage feedback circuit 17 in this embodiment is for providing the feedback path responding to the output voltage, and the circuit type of the voltage feedback is not limited by the present disclosure. The voltage feedback circuit 17 is only an example and is only for explanation, not for limiting the scope of the present disclosure.

The DC-DC converter 10 includes a capacitor 104, an inductor 103, and at least one power switch, as shown in FIG. 1, there are two power switches 101 and 102. The power switches 101 and 102 are coupled to the inductor 103. The power switches 101 and 102 in FIG. 1 are respectively a P type metal-oxide semiconductor field-effect transistor (PMOS) and an N type metal-oxide semiconductor field-effect transistor (NMOS). The present disclosure does not limit the implementations of the power switches 101 and 102.

The pulse width control unit 11 is coupled to the power switches 101 and 102, and is for controlling the power switches 101 and 102 to turn on or turn off. The current feedback circuit 12 detests the current passing through the inductor 103, and generates a current feedback signal Isense according to the detected current which passes through the inductor 103.

The fast transient feedback circuit 13 generates the transient feedback signal Iadd according to the first voltage feedback signal VFB1, and the first voltage feedback signal VFB1 is responding to the output voltage Vout. In FIG. 1, the first voltage feedback signal received by the fast transient feedback circuit 13 is the output voltage Vout, however, the scope of the present disclosure is not limited thereby. In normal situations, the first voltage feedback signal VFB1 can be generated after dividing the output voltage Vout by a voltage division circuit, and the voltage division circuit can be the voltage feedback circuit 17 shown in FIG. 1. The fast transient feedback circuit 13 and the first error amplifier 14 can use the same feedback path provided by the voltage feedback circuit 17. At the time, the first voltage feedback signal VFB1 equals to the second voltage feedback signal VFB2. Alternatively, the fast transient feedback circuit 13 can have an independent voltage feedback path which is different from the voltage feedback circuit 17.

The first error amplifier 14 amplifies the difference value between the second voltage feedback signal VFB2 and the reference signal Vref, and compensates the difference value through the resistor R1 and the capacitor C1 for generating the error amplification signal Vc. The second voltage feedback signal VFB2 is responding to the output voltage Vout. In this embodiment, the inverting input terminal of the first error amplifier 14 is coupled to the voltage feedback signal 17, and the non-inverting input terminal of the first error amplifier 14 receives the reference signal Vref.

As shown in FIG. 1, the second voltage feedback signal VFB2 is generated by dividing the output voltage Vout through the voltage feedback circuit 17. The voltage feedback circuit 17 includes the serially connected resistors 171 and 172, and the voltage of the coupling node between the resistors 171 and 172 is the second voltage feedback signal VFB2. In other words, the voltage feedback circuit 17 receives the output voltage Vout, and generates the second voltage feedback signal VFB2 according to the output voltage Vout.

The adder 15 adds the current feedback signal Isense and the transient feedback signal Iadd for generating a modifying current feedback signal Vsense. The adder 15 can be, for example, a current type adder or a voltage type adder. In this embodiment, the adder 15 is also coupled to a ramp signal generator 18. The ramp signal generator 18 provides a ramp signal Iramp to the adder 15. The present disclosure does not limit that the ramp signal Iramp is only provided to the adder 15. The ramp signal Iramp is for allowing the comparator 16 to compare the amplitude of the ramp signal Iramp with a command signal (such as the modifying current feedback signal Vsense or the error amplification signal Vc), and the comparator 16 may be able to output a control signal for controlling the power switches 101 and 102. According to the actual requirements, the ramp signal Iramp may only be provided to one of the non-inverting input terminal and the inverting input terminal of the comparator 16. For example, the ramp signal Iramp may be added with the error amplification signal Vc through an adder, and then the added signal (Vc+Iramp) is inputted to the inverting input terminal of the comparator 16.

The comparator 16 compares the error amplification signal with the modifying current feedback signal Vsense for generating a comparison signal. As shown in FIG. 1, the inverting input terminal of the comparator 16 receives the error amplification signal Vc, and the non-inverting input terminal of the comparator 16 receives the modifying current feedback signal Vsense. The comparator 16 provides the comparison signal to the pulse width control unit 11, and the pulse width control unit 11 controls the duty cycles of the power switches 101 and 102 of the DC-DC converter 10 according to the comparison signal. In this embodiment, the pulse width control unit 11 includes a latch 111 and a controller 112. The controller 112 may include the capabilities of driving circuits and setting dead time.

Figure 2:
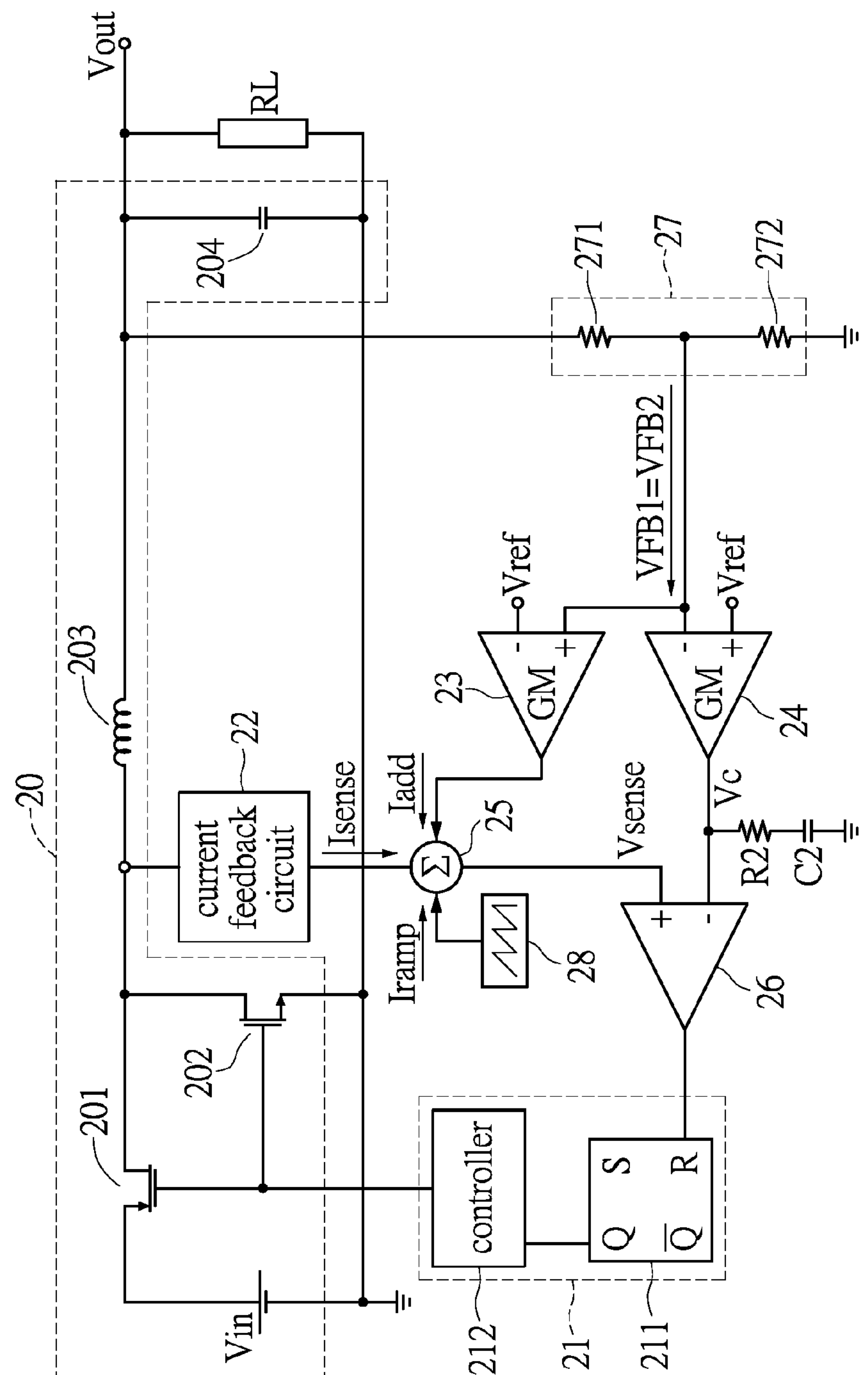
FIG. 2 shows a detailed circuit diagram of a current mode DC-DC conversion device with fast transient response according to an embodiment of the present disclosure.

Then please refer to FIG. 1 and FIG. 2 at the same time. FIG. 2 shows a detailed circuit diagram of a current mode DC-DC conversion device with fast transient response according to an embodiment of the present disclosure. As shown in FIG. 2, the current mode DC-DC conversion device 2 with fast transient response includes a DC-DC converter 20, a pulse width control unit 21, a current feedback circuit 22, a fast transient feedback circuit 23, a first error amplifier 24, an adder 25, a comparator 26, a voltage feedback circuit 27, a ramp generator 28, a resistor R2 and a capacitor C2. The DC-DC converter 20 includes a capacitor 204, an inductor 203, and two power switches 201 and 202, as shown in FIG. 2. The pulse width control unit 21 includes a latch 211 and a controller 212. The voltage feedback circuit 27 includes the resistors 271 and 272 which are serially connected with each other.

The current mode DC-DC conversion device 2 with fast transient response in FIG. 2 is approximately the same as the current mode DC-DC conversion device 1 with fast transient response in FIG. 1. The differences between the two devices are that the fast transient feedback circuit 13 in FIG. 1 is implemented by the fast transient feedback circuit 23 in FIG. 2. The first transient feedback circuit 23 is coupled to the voltage feedback circuit 27. The fast transient feedback circuit 23 includes a second error amplifier. As shown in the figure, the fast transient feedback circuit 23 is the second error amplifier. The non-inverting input terminal of the second error amplifier is coupled to the inverting input terminal of the first error amplifier 24, and the inverting input terminal of the second error amplifier receives the reference signal Vref. At the moment, the first voltage feedback signal VFB1 equals to the second voltage feedback signal VFB2.

Figure 3:
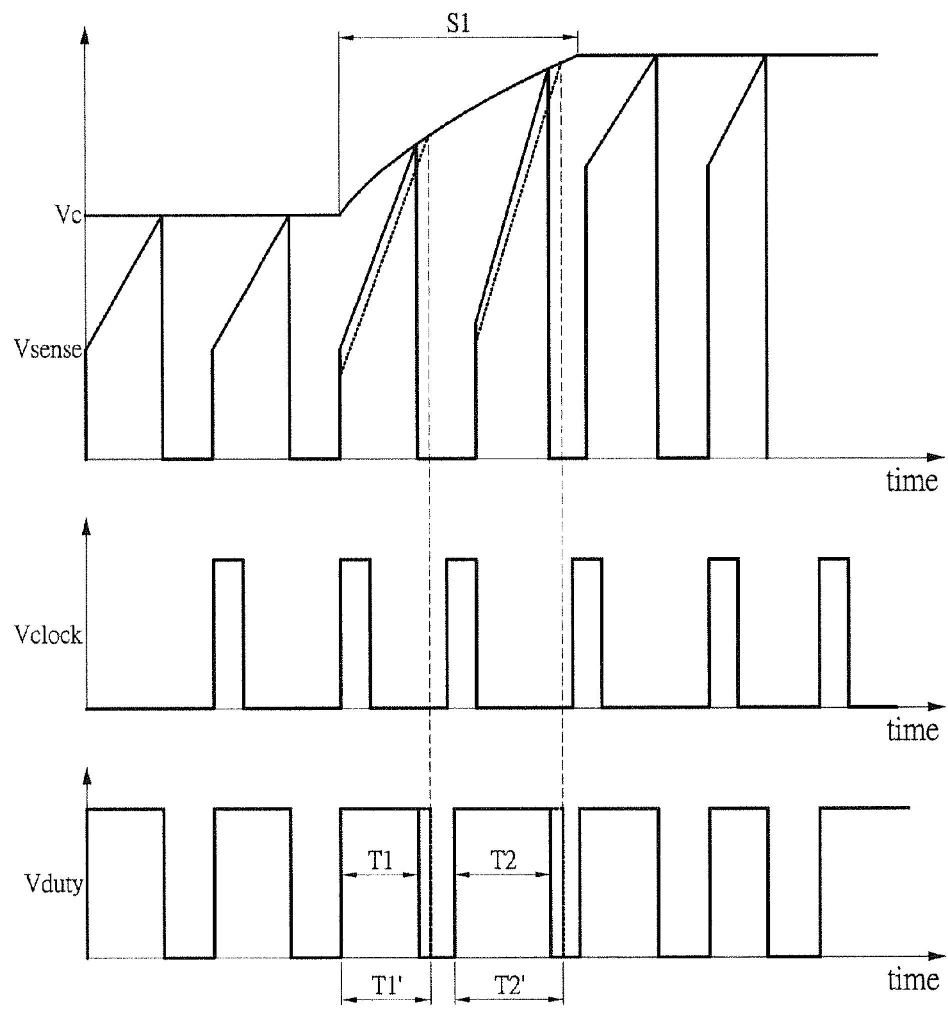
FIG. 3 shows a waveform diagram of a current mode DC-DC conversion device with fast transient response changing from light load to heavy load according to an embodiment of the present disclosure.

Please refer to FIG. 3 which shows a waveform diagram when a current mode DC-DC conversion device with fast transient response changes from light load to heavy load according to an embodiment of the present disclosure. Because when the load changes from light to heavy (as the load conversion interval S1 shown in FIG. 3), the output voltage Vout may undershoot. At the moment, the fast transient feedback circuit 13 pulls down the modifying current feedback signal Vsense, as the dotted line shown in FIG. 3, for increasing the duty cycle. As shown in FIG. 3, the duty cycles T1 and T2 of the duty cycle signal Vduty are respectively increased to T1' and T2'. The clock of the clock signal Vclock is corresponding to the clocks of the ramp signal Iramp and the modifying current feedback signal Vsense. In other words, when the DC-DC converter 20 changes from light load to heavy load, the transient feedback signal Iadd generated by the fast transient feedback circuit 23 makes the pulse width control unit 21 increase the duty cycles of the power switches 201 and 202.

Figure 4:
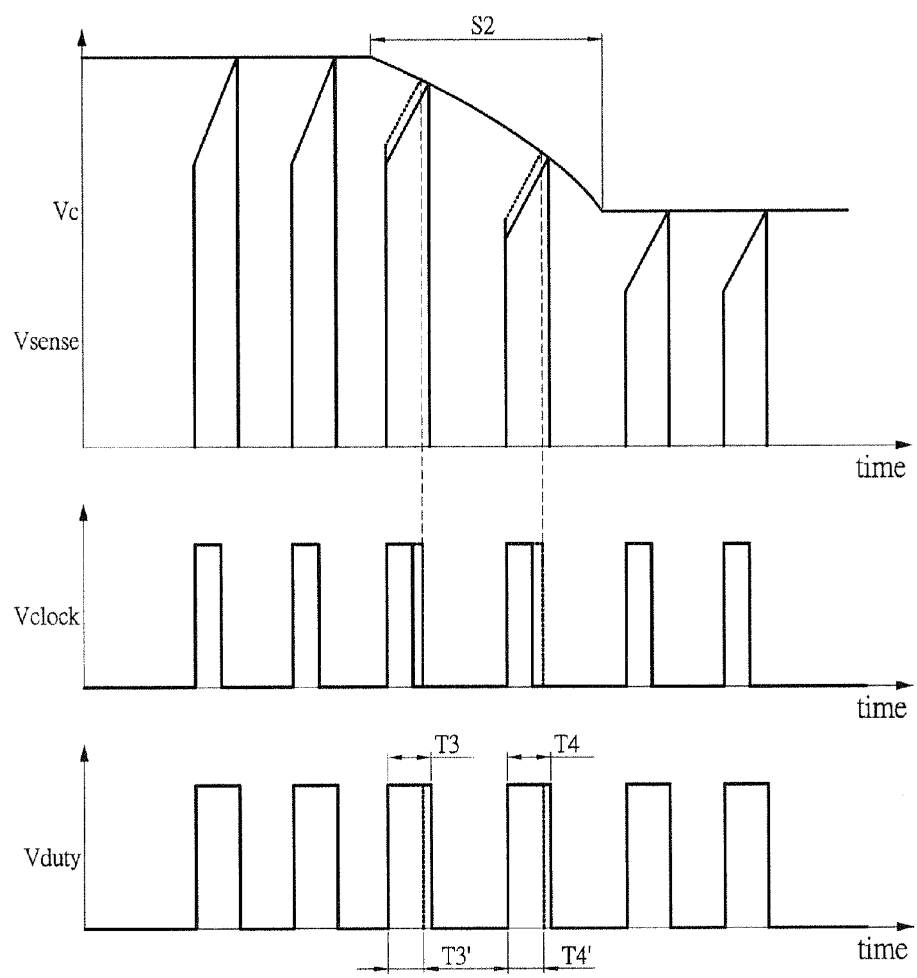
FIG. 4 shows a waveform diagram of a current mode DC-DC conversion device with fast transient response changing from heavy load to light load according to an embodiment of the present disclosure.

Please refer to FIG. 4 which shows a waveform diagram when a current mode DC-DC conversion device with fast transient response changes from heavy load to light load according to an embodiment of the present disclosure.

Because when the load changes from heavy to light (such as the load conversion interval S2 shown in FIG. 4), the output voltage Vout may overshoot. At the moment, the fast transient feedback circuit 13 pulls up the modifying current feedback signal Vsense, as the dotted line shown in FIG. 4, for reducing the duty cycle. As shown in FIG. 4, the duty cycles T3 and T4 of the duty cycle signal Vduty are respectively reduced as T3' and T4'. Similarly, the clock of the clock signal Vclock is corresponding to the clocks of the ramp signal Iramp and the modifying current feedback signal Vsense. In other words, when the DC-DC converter 20 changes from heavy load to light load, the transient feedback signal Iadd generated by the fast transient feedback circuit 23 makes the pulse width control unit 21 reduce the duty cycles of the power switches 201 and 202.

[another embodiment of a current mode DC-DC conversion device with fast transient response]

Figure 5:
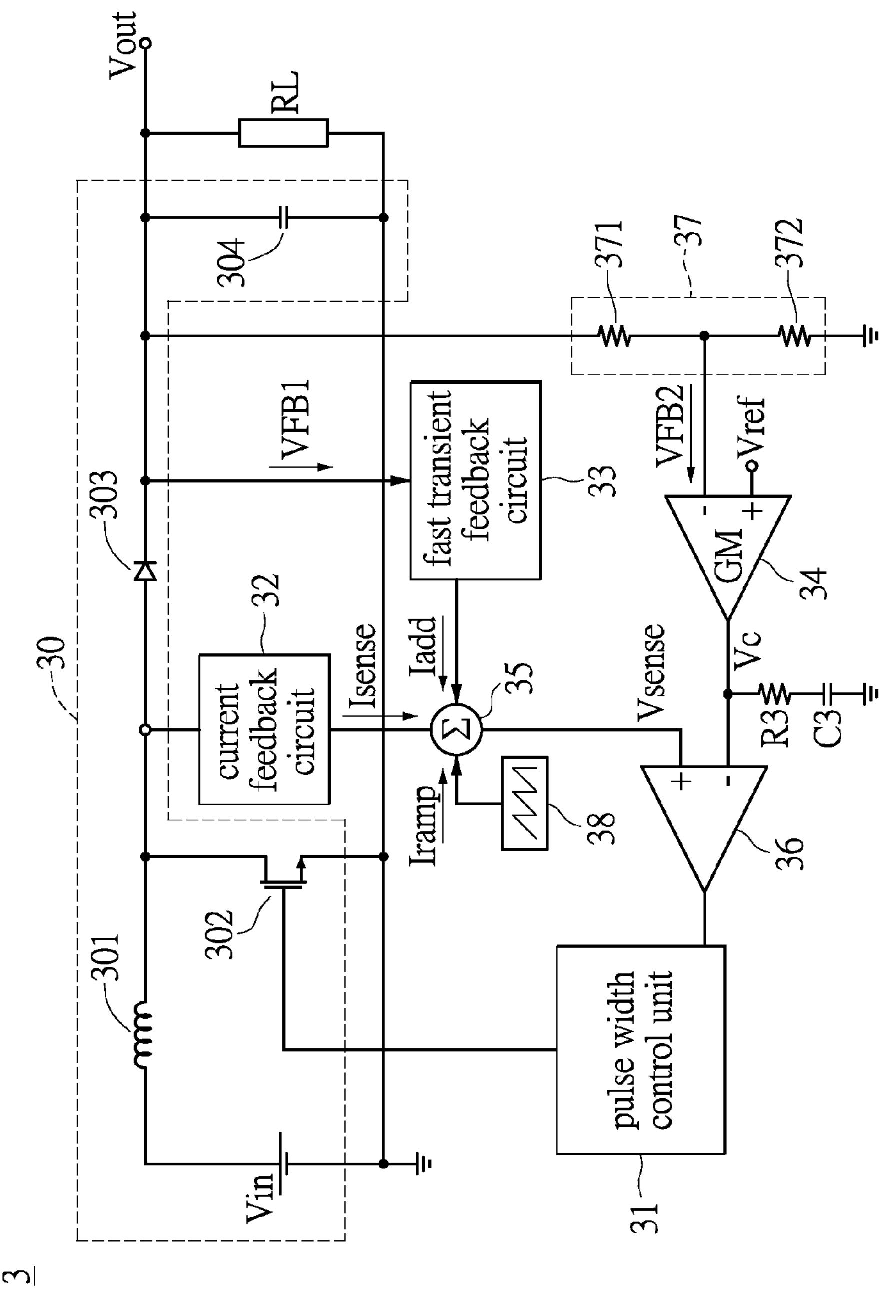
FIG. 5 shows a circuit diagram of a current mode DC-DC conversion device with fast transient response according to another embodiment of the present disclosure.

Please refer to FIG. 1 along with FIG. 5. FIG. 5 shows a circuit diagram of a current mode DC-DC conversion device with fast transient response according to another embodiment of the present disclosure. As shown in FIG. 5, the current mode DC-DC conversion device 3 with fast transient response includes a DC-DC converter 30, a pulse width control unit 31, a current feedback circuit 32, a fast transient feedback circuit 33, a first error amplifier 34, an adder 35, a comparator 36, a voltage feedback circuit 37, a ramp generator 38, a resistor R3 and a capacitor C3. The DC-DC converter 30 is a boost converter, and includes a capacitor 304, an inductor 301, a power diode 303, and a power switch 302. The voltage feedback circuit 37 includes the resistors 371 and 372 which are serially connected with each other.

The current mode DC-DC conversion device 3 with fast transient response in FIG. 5 is approximately the same as the current mode DC-DC conversion device 1 with fast transient response. The differences between the two devices are that the DC-DC converter 10 is changed from the buck converter to the boost converter. The power switch 302 of the DC-DC converter 30 also uses the pulse width modulation for controlling.

On the basis of the above, the current mode DC-DC conversion device with fast transient response provided by the present disclosure adds the feedback voltage with the current feedback signal through the fast transient feedback circuit, for making the output voltage be fast responding to different load changes in continuous time. The fast transient feedback mechanics used by the DC-DC conversion device can be applied to the buck converter or the boost converter.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A current mode DC-DC conversion device with fast transient response, comprising:

a DC-DC converter, including an inductor and at least one power switch, wherein the power switch is coupled to the inductor, and the DC-DC converter converts an input voltage into an output voltage;

a pulse width control unit, coupled to the power switch;

a current feedback circuit, for detecting a current passing through the inductor, and for generating a current feedback signal according to the current passing through the inductor;

a fast transient feedback circuit, for generating a transient feedback signal according to a first voltage feedback signal, wherein the first voltage feedback signal is responding to the output voltage;

a first error amplifier, for amplifying a difference value between the a second voltage feedback signal and a reference signal to generate an error amplification signal, wherein the second voltage feedback signal is responding to the output voltage;

an adder, for adding the current feedback signal and the transient feedback signal to generate a modifying current feedback signal; and a comparator, for comparing the error amplification signal with the modifying current feedback signal to generate a comparison signal, and providing the comparison signal to the pulse width control unit, wherein the pulse width control unit controls a duty cycle of the power switch of the DC-DC converter according to the comparison signal;

wherein when the DC-DC converter changes from light load to heavy load, the modifying current feedback signal is pulled down by adding the transient feedback signal, and the pulse width control unit increases the duty cycle of the power switch.

2. The current mode DC-DC conversion device with fast transient response according to claim 1, wherein the DC-DC converter is a boost converter or a buck converter.

3. The current mode DC-DC conversion device with fast transient response according to claim 1, further comprising:

a voltage feedback circuit, for receiving the output voltage and generating the second voltage feedback signal according to the output voltage.

4. The current mode DC-DC conversion device with fast transient response according to claim 3, wherein the fast transient feedback circuit is coupled to the voltage feedback circuit.

5. The current mode DC-DC conversion device with fast transient response according to claim 3, wherein an inverting input terminal of the first error amplifier is coupled to the voltage feedback circuit, a non-inverting input terminal of the first error amplifier receives the reference signal, and the fast transient feedback circuit includes a second error amplifier, wherein a non-inverting input terminal of the second error amplifier is coupled to the inverting input terminal of the first error amplifier, and an inverting input terminal of the second error amplifier receives the reference signal.

6. The current mode DC-DC conversion device with fast transient response according to claim 1, wherein the first voltage feedback signal equals to the second voltage feedback signal.

7. The current mode DC-DC conversion device with fast transient response according to claim 1, further comprising:

a ramp generator, for providing a ramp signal to the adder.

8. The current mode DC-DC conversion device with fast transient response according to claim 1, wherein when the DC-DC converter changes from heavy load to light load, the transient feedback signal generated by the fast transient feedback circuit makes the pulse width control unit reduce the duty cycle of the power switch.

9. The current mode DC-DC conversion device with fast transient response according to claim 1, wherein the pulse width control unit includes a latch.

* * * * *